(12) United States Patent
Salome et al.

(10) Patent No.: US 10,218,966 B2
(45) Date of Patent: Feb. 26, 2019

(54) METHOD FOR COLLECTING IMAGE DATA FOR PRODUCING IMMERSIVE VIDEO AND METHOD FOR VIEWING A SPACE ON THE BASIS OF THE IMAGE DATA

(71) Applicant: PARALLAXTER, Brussels (BE)

(72) Inventors: Tristan Salome, Brussels (BE); Michael De Coninck, Brussels (BE); Chris Mascarello, Brussels (BE); James Vanderhaegen, Brussels (BE); Gael Honorez, Brussels (BE)

(73) Assignee: PARALLAXTER, Brussels (BE)

( * ) Notice: Subject to any disclaimer, the term of this patent is extended or adjusted under 35 U.S.C. 154(b) by 0 days.

(21) Appl. No.: 15/520,891

(22) PCT Filed: Oct. 22, 2015

(86) PCT No.: PCT/BE2015/000056
§ 371 (c)(1),
(2) Date: Dec. 13, 2017

(87) PCT Pub. No.: WO2016/061640
PCT Pub. Date: Apr. 28, 2016

(65) Prior Publication Data
US 2018/0115769 A1 Apr. 26, 2018

(30) Foreign Application Priority Data
Oct. 22, 2014 (BE) .................. 2014/05025

(51) Int. Cl.
H04N 13/00 (2018.01)
H04N 13/282 (2018.01)
(Continued)

(52) U.S. Cl.
CPC ......... *H04N 13/282* (2018.05); *H04N 13/257* (2018.05); *H04N 13/275* (2018.05);
(Continued)

(58) Field of Classification Search
USPC ....................................... 348/42–53
See application file for complete search history.

(56) References Cited

U.S. PATENT DOCUMENTS 9,055,886 B1* 6/2015 Garretson ............ G01N 23/203
2008/0316301 A1 12/2008 Givon
(Continued)

FOREIGN PATENT DOCUMENTS

WO 2013/086739 6/2013

*Primary Examiner* — Nigar Chowdhury
(74) *Attorney, Agent, or Firm* — Jacobson Holman PLLC

(57) ABSTRACT

A method for collecting image data destined for producing an immersive video, which method comprises a determination of a zone of viewpoints and the set-up of a set of source points situated at end points of the zone of viewpoints, as well as the placement of each time a scanner of a first set of scanners at each of said source points for scanning step by step a space by means of scanning beams and according to a succession of on the one hand azimuth angles and on the other hand elevation angles each situated in a range predetermined by the zone of viewpoints, and determining on the basis of reflected scanning beams image data formed by a distance between the point touched by a beam and the scanner having produced the concerned scanning beam as well as a colour parameter of said touched point and storing them in a memory.

15 Claims, 12 Drawing Sheets

(51) Int. Cl.
*H04N 13/257* (2018.01)
*H04N 13/383* (2018.01)
*H04N 13/344* (2018.01)
*H04N 13/398* (2018.01)
*H04N 13/279* (2018.01)
*H04N 13/275* (2018.01)

(52) U.S. Cl.
CPC ......... *H04N 13/279* (2018.05); *H04N 13/344* (2018.05); *H04N 13/383* (2018.05); *H04N 13/398* (2018.05)

(56) References Cited

U.S. PATENT DOCUMENTS

| | | |
|---|---|---|
| 2012/0157851 A1* | 6/2012 | Zwirn .................. A61B 8/4488 600/447 |
| 2013/0002827 A1 | 1/2013 | Lee et al. |
| 2013/0083173 A1 | 4/2013 | Geisner et al. |
| 2014/0098186 A1 | 4/2014 | Seidl et al. |
| 2015/0168552 A1* | 6/2015 | Bonin .................... G01B 11/24 356/5.01 |
| 2015/0204973 A1* | 7/2015 | Nohara ................ G01S 13/426 342/107 |

* cited by examiner surface_apparent $\approx d^2 / \cos(\beta)$

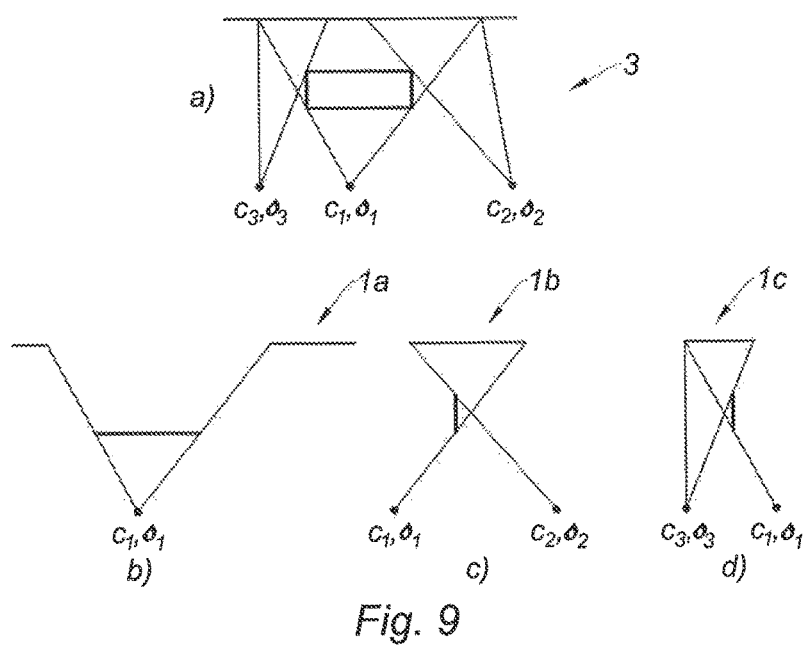
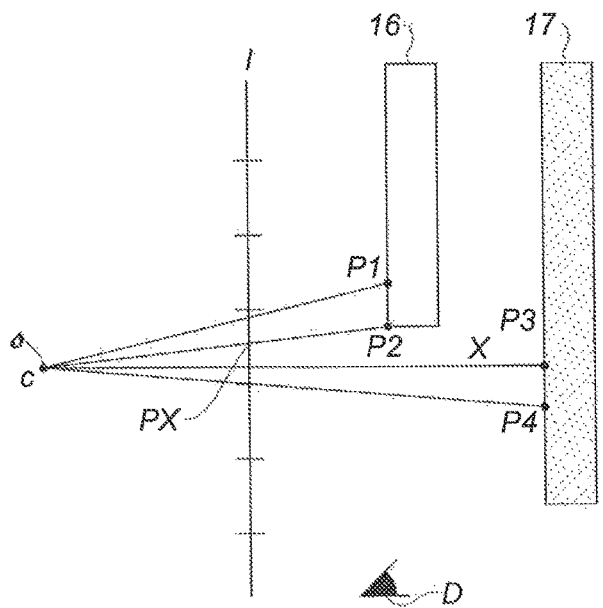
Fig. 9
Fig. 10

METHOD FOR COLLECTING IMAGE DATA FOR PRODUCING IMMERSIVE VIDEO AND METHOD FOR VIEWING A SPACE ON THE BASIS OF THE IMAGE DATA

The present invention relates to a method for collecting image data destined for producing an immersive video, which method comprises a setting up of a first set of at least n (n>1) scanners, each being provided for producing scanning beams, which method also comprises the scanning of a predetermined space by each of the scanners of said first set of scanners by means of scanning beams for producing the image data of said space, which image data are stored in a memory. She also relates to a visualisation method of this image data.

Such a method is known from the US patent application 2013/0083173. Such a method is also used in video games for creating sceneries. To enable to visualise images produced with an immersive video it is necessary to first collect image data. This is realised by means of a set of scanners which scan a predetermined space which forms the scene in which the immersive video takes place. The image data thus collected are stored in the memory.

When the user of a video game wants to move himself in the tri-dimensional scene of the video game he will generally use a keyboard and a computer mouse which executes the video game. The video game will then calculate in real time the rendering of the 3D scene starting from the new viewpoint of the virtual person and this rendering is displayed on the computer screen. This enables the user to move himself in the virtual world of the video game and to interact with that world.

These simple interactions already enable some users, within a few minutes of the game, to feel themselves in the skin of the virtual person of the video game. The virtual immersion sensation consists in giving the impression to the user of being physically really within the virtual 3D scene. This sensation can be more or less strong in function of the appropriateness between what is felt by the user's senses and what will be felt if the user was really in the physical equivalent of the virtual 3D scene, that is to say in the real world. Systems which presents to the user eyes images which are coherent with the rotation movements of his head are generally called virtual reality systems.

The technique most commonly used for obtaining a virtual reality system is a virtual reality headset. The user wears the headset on his head, and the headset is connected to the computer. By means of screens and a set of lenses placed before the user's eyes, the headset presents to each eye synthesis images calculated in real time by the computer. The headset also comprises a sensor enabling to measure the orientation of the user's head. The principle is the following: the user turns his head, the virtual reality headset captures this head movement and sends information about the user's new head orientation to the computer, the computer produces a stereoscopic rendering of the virtual 3D scene with an orientation of the two virtual cameras corresponding to the new orientation of the user's eyes, the images rendered in real time by the computer are displayed in front of the user's eyes.

Different factors will influence the quality of the virtual immersion at visual level. The principal factor is the appropriateness between the user's head movement, which is measured by his inner ear, and his vision. The human being is used to a perfect appropriateness between these two senses in the real world. According to the incoherence range between the images seen by the eyes and the movements felt by the inner ear of the user, the latter will feel a slight discomfort sensation, a visual exhausting, headaches, a sickness sensation and stomach reversal which could even lead to vomiting. Those effects are called virtual reality sickness or "Cyber-Sickness" and are similar to sea sickness.

The known immersive videos are monoscopic or stereoscopic pre-recorded or pre-calculated movies which cover a vision field of 360 degrees around the user. Those known immersive videos can be visualised by means of a virtual reality headset. The virtual reality headset measures the user's head orientation and enables the computer to send to the headset display the images for the right and left eye corresponding to this orientation.

For known immersive videos, as for normal videos, the images are pre-recorded or pre-calculated, they are thus not calculated in real time. Thus, instead of 1/60 of a second for example for calculating an image in real time, it could have been calculated in more than one hour. This enables to have an image quality which is much better than the one of virtual reality.

When the user performs a translation movement with his head, his visual field will be shifted. During such a shift the images of the objects which are near to the user will move faster than the images of objects which are further away. This effect is clearly observed when one is in a moving train and looks through the window, one sees the close fences move very fast, while far away mountains look as if they stay still. This effect is called parallax.

A problem of the known immersive videos is that they do not take into account the translation movements of the head of the user and thus that that they cannot provide interactive parallax. This limitation strongly restricts the immersive quality of the known immersive videos. Indeed, the user's brain expects to see parallax when his head moves, but does not perceive it. This shortcoming reduces the user's vision comfort as well as the immersive sensation and increases strongly the risk of "Cyber-Sickness".

It is an object of the invention to realise a method for collecting image data destined for producing immersive video which enables to take into account these movements, in particular the translation movements, of the user's head.

To this purpose a method for collecting image data destined for producing an immersive video is characterised in that a zone of viewpoints is determined by delimiting a volume from which a user of the immersive video will be able to see said space and to perform head a movement, in particular a translation movement, inside the zone of viewpoints, a second set of m (m>1) source points located at the ends of the zone of viewpoints being thereafter determined, which setting up of said first set of at least n scanners being realised by placing at each of said source points each time one of said scanners of said first set, said scanning of said space being done by means of said scanners placed at said source points and by scanning step by step said space according to a succession of at the one hand azimuth angles and on the other hand elevation angles each located in a range predetermined by said zone of viewpoints, which production of image data is performed by collecting for each produced scanning beam the scanning beam reflected by each time a touched point situated within said space and touched by the concerned scanning beam and by determining by each step and on the basis of the reflected scanning beam a distance between the touched point and the scanner having produced the concerned scanning beam as well as a colour parameter of said touched point, said data being stored in the memory in the form of a matrix structured according to the azimuth and elevation angles.

By determining a zone of viewpoints which delimits a volume from which a user of the immersive video will be able to see said space and perform a movement with his head inside the viewpoints zone, it will become possible to determine the source points where the scanners will be placed and thus to scan the space as from those source points. This will then enable to collect image data as from this viewpoint zone and thus to take into account the movements, in particular the translation movements, of the user's head and to provide inside the headset a view with an interactive parallax effect. One speaks about interactive parallax by opposition to a parallax which could be qualified as passive, which would be linked to the displacement in an immersive video of the viewpoint executed by the director of the immersive video.

The virtual reality systems enable to have this interactive parallax, but they have therefor to calculate in real time the images presented to the user's eyes. This calculation in real time strongly reduces the image quality.

The method for creating immersive videos with interactive parallax according to the invention uses pre-calculated synthesis images or real shootings, thereby providing a better image quality in comparison to the real time of virtual reality. The inclusion of the interactive parallax in immersive videos enables the user to feel a very good immersive sensation, and reduces substantially the risk of cyber-sickness.

The zone of viewpoints enables to limit the quantity of information which has to be stored in order to reproduce the scanned space. This limitation of information enables to have a quantity of information and data which can be managed. The configuration, the dimension and shape, of the zone of viewpoints predetermines the number and set-up of the scanners used for scanning the space.

A first preferred embodiment of the method according to the invention is characterised in that the zone of viewpoints is formed by an essentially rectangular volume, in particular a rectangular parallelepiped, having a height of at least 30 cm, a depth of at least 30 cm and a width of at least 30 cm. This enables to cover the positions which can be reached during the translation movements and/or the rotation of the user's head, when the latter maintains the rest of his body in a fixed position.

A second preferred embodiment of the method according to the invention is characterised in that the stored data are filtered by determining for each point touched by a scanner if that point can be reached by a beam launched by at least one other of said n scanners, and in case where the considered touched point can be reached by a beam launched by at least another of said n scanners it is determined on the basis of a predetermined selection criteria if the stored data of the considered touched point have to be eliminated from the stored data. This filtering step enables to filter and save only the points which give useful information. This enables to reduce the amount of stored data for producing immersive video with interactive parallax.

A third preferred embodiment of the method according to the invention is characterised in that the selection criteria is based on the area of the surface scanned between two successive scanning steps according to the azimuth angle and two successive scanning steps according to the elevation angle by the scanner having produced the considered touched point and the single or several scanners among the other n scanners being able to reach the considered touched point.

Preferably the method according to the invention is characterised in that the scanners which are used are either virtual scanners, or physical scanners. The scene can thus be produced through virtual or physical scanners, the latter being used in a same manner as director records with his camera the scenes of his movie.

According to another preferred embodiment of the method according to the invention the zone of viewpoints is shifted in said space from a first position towards a second position situated at a predetermined distance of the first position, the scanning by each of the scanners of said first set of scanners and the production and storage of the image data of said space being repeated for each second position of the zone of viewpoints after the one realised for the first position. It is thus possible to consider the system as creating around the user at visualisation time a virtual 3D scene for each time fraction of the immersive video. Each of those ephemeral 3D virtual scenes is limited to what the user can see from his zone of viewpoints. The evolution of the aspect of those scenes corresponds to the movement of the objects and/or persons in the video and to the displacement of the position of the zone of viewpoints controlled by the movie director. Thus, contrary to the virtual reality where, at the moment of the rendering in real time, a camera is moved in the 3D scene when the user is moving. According to the invention it is the 3D scene which moves changes around the user when the zone of viewpoints has been displaced at the creation of the immersive movie with interactive parallax.

The visualisation method of immersive videos with interactive parallax according to the invention comprises:
a) a determination within the zone of viewpoint of a position and an orientation of the eyes of a user by means of sensors and the use of an algorithm predicting the head movement of the user, for determining what will be seen by the user;
b) a selection on the basis of the position and orientation of the eyes of the user of image data among the stored image data necessary for visualising the part of the space which can be seen by the user;
c) a loading in a temporary memory of the selected image data;
d) a production of two images on the basis of the image data stored in the temporary memory; and
e) a presentation to the user's eyes of the two produced images.

This enables to display to the user a density of points loaded as from image data which is coherent with the definition of what is displayed in a virtual reality headset.

Preferably the visualisation method according to the invention is characterised in that the presentation of two images to the user is performed by means of a virtual reality headset.

Preferably the visualisation according to the invention is characterised in that it is used in a device conferring movement to the user, the coordinates of said conferred movement being sent to a visualisation system which applies said visualisation method for synchronising the flow of images with said movements. This enables to couple to the visualisation according to the invention the movements conferred to the user.

The immersive video can thus be applied to a "ride" in attraction parks. The principle of a ride is to be embarked, generally in a seat through different scenery. This comparable to rollercoaster, but the accent is more put on visiting the sceneries than on the sensation of acceleration.

The present invention will now be described in more details by means of the drawings showing a preferred embodiment of the method according to the invention. In the drawings.

Figure 11:
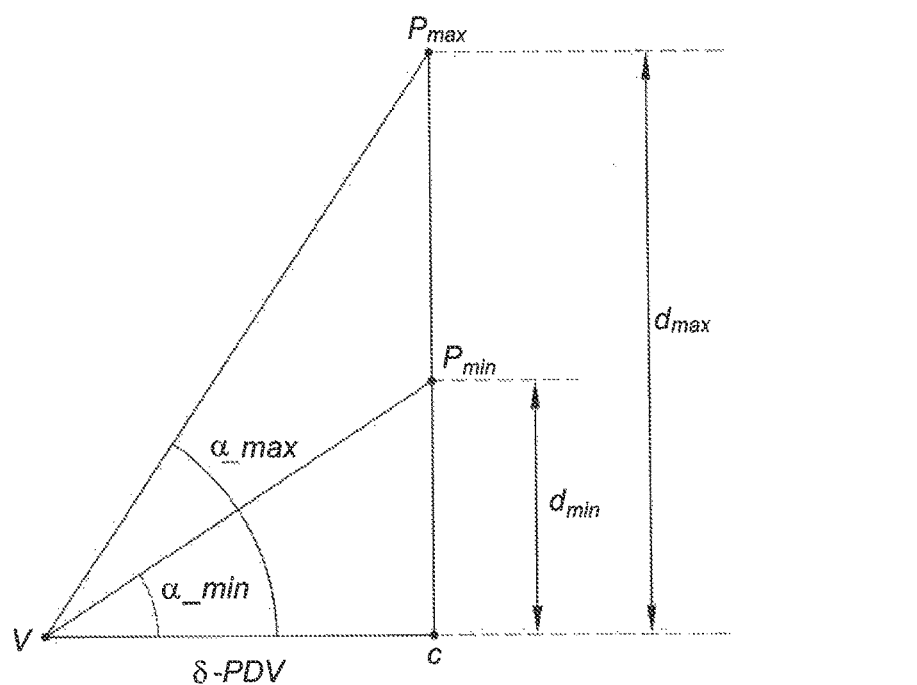
Figure 12:
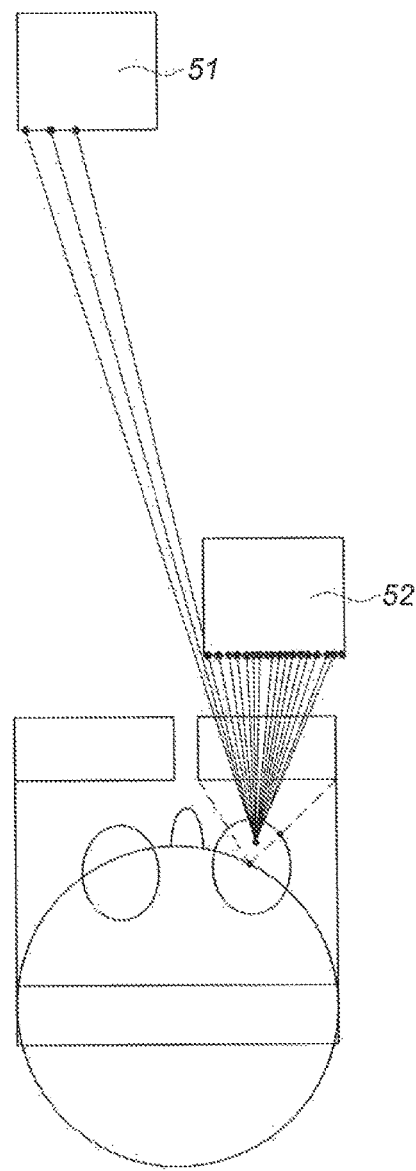
Figure 13:
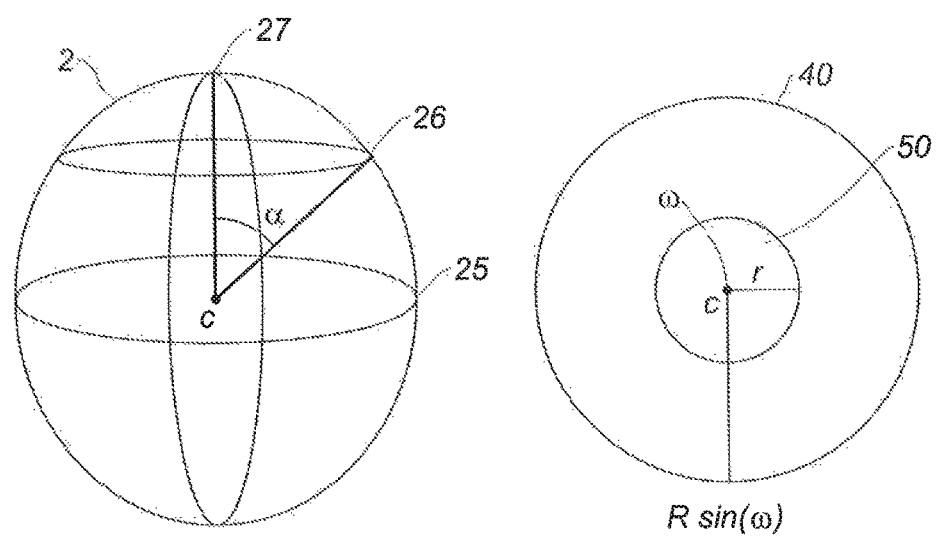
Figure 13:
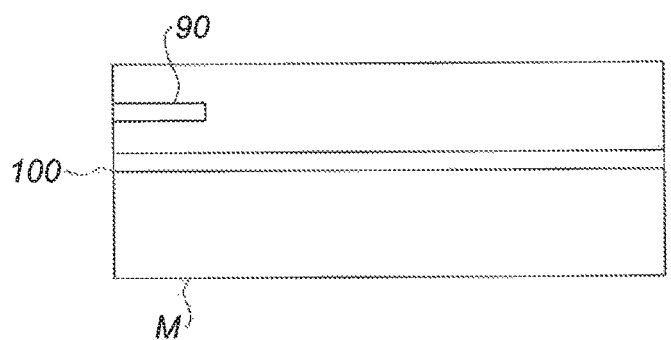
Figure 14:
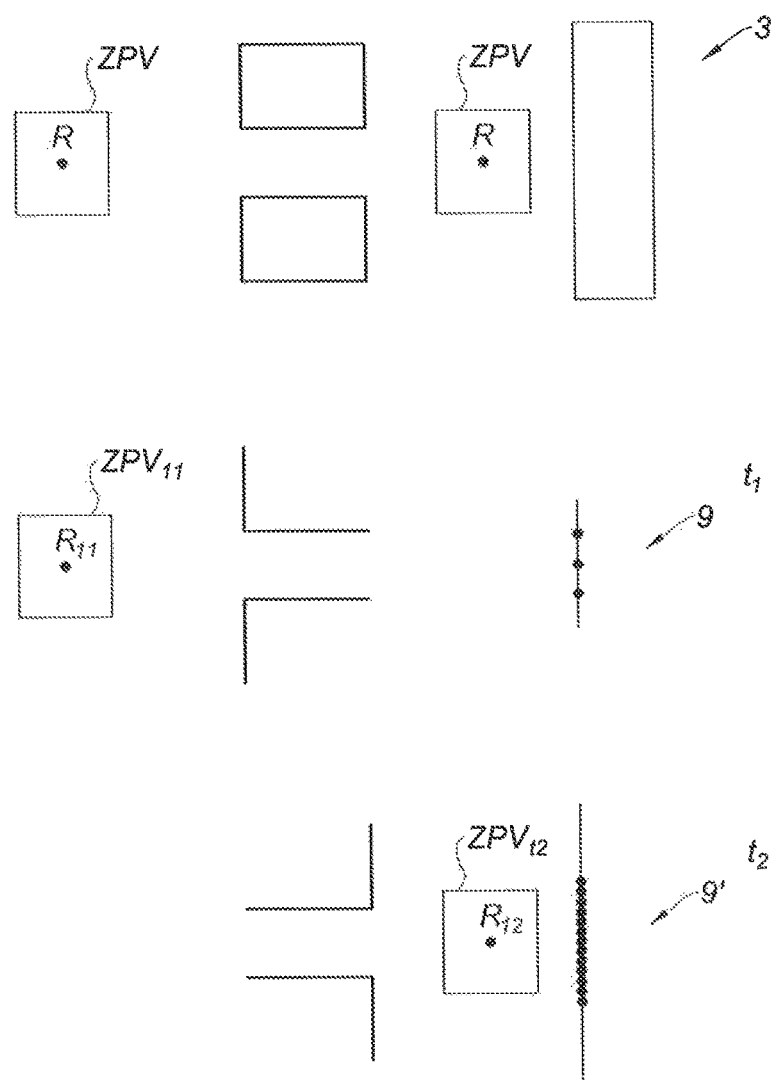
Figure 15:
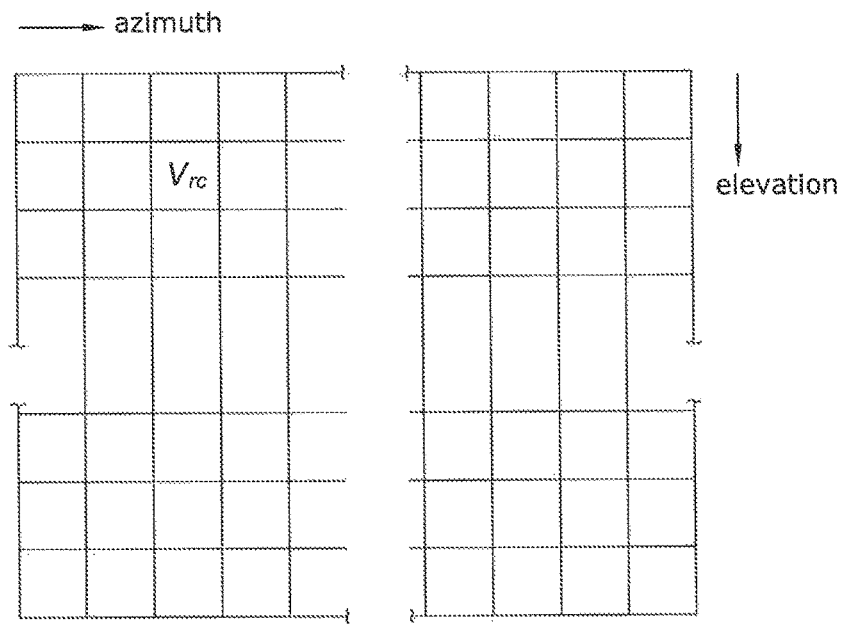

FIGS. 9a to d illustrate the filtering method granting a priority to the scanners;

FIG. 10 illustrates the sampling by means of other scanning beams of a space having objects situated a different distance with respect to the central point of the scanner;

FIG. 11 illustrates a relation concept between the maximum and minimum distance of the other touched points and the perception by the user as from a viewpoint shifted with respect to the scanner;

FIG. 12 illustrates that a density of touched points is coherent with the angular definition of the display;

FIG. 13 illustrates the ecospheric representation of a scanning and the storage related thereto;

FIG. 14 illustrates the concept of the transfer of the zone of viewpoints;

FIG. 15 illustrates the storage of image data in the memory; and

Figure 16:
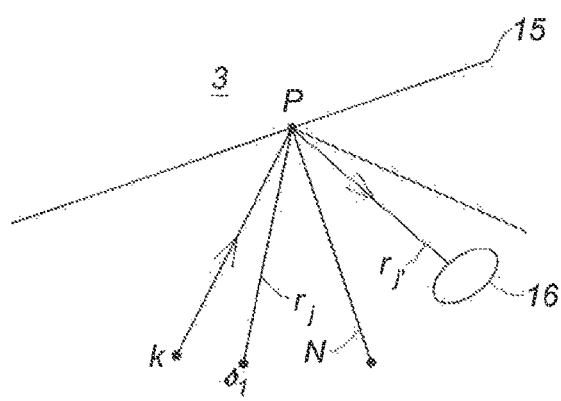

FIG. 16 illustrates the concept of modifying the reflected beam.

In the drawings, a same reference sign has been allotted to a same or analogous element.

Computer programs can simulate the equivalent of a complete movie studio including the scenery, the lighting and the cameras. Here, we speak about tri-dimensional objects, virtual light and cameras, those elements do not exist in the real physical world, they only exist as a simulated representation in a computer. An example of a computer program of this type is the "Maya" software of the company "Autodesk". The set of those virtual tri-dimensional elements, for example formed by objects, light and a camera, is called virtual 3D scene, or more simply the 3D scene or virtual 3D space.

Once the virtual 3D space is put in place, the computer can calculate the image corresponding to what is seen by the virtual camera in the virtual 3D space and this taking into account the objects and lighting present in that 3D space and the position of the virtual camera. This calculation is called 3D virtual space rendering and the resulting image of this rendering is a synthesis image.

Both eyes of a user see the physical real world according to two viewpoints which are slightly different, they are spaced apart on average by 6.5 cm for an adult person. This distance is called interocular distance. This small shift of the viewpoint on a same real scene, enables the brain of the user to define at which distance the objects around him are located. A stereoscopic movie consists in rendering two different images of a same scene for each eye of the user in order to produce the depth effect.

The rendering software can take into account the movements of objects present in the space and the luminosity thereof. If then the software is requested to furnish successive renderings at different moments in time, the rendered images will be different and a movie with synthesis images will be obtained. In the framework of the traditional movie, a second of an action is decomposed in twenty-four fixed images, and thus for creating a movie in synthesis images for a presentation in a movie theatre, it will be necessary to calculate twenty-four images per second for an action in a movie.

One speaks about pre-calculated synthesis images when the different images of the movie are first rendered and stored, and then played later at a pace corresponding with the diffusion media of for example twenty-four images per second for a traditional movie. The calculation of each synthesis image can take a lot of time for obtaining a good image quality. In most cases, the rendering takes more than one hour per image. Thus, it is typical that a computer calculates during a whole day long (twenty-four times one hour) the equivalent of one second of the movie (twenty-four images per second).

If the computer is capable to render each image at the same pace than the pace used to display the images, one then speaks about that the rendering is computed in real time. Again, in the example of the movie with twenty-four images per second, in order to render the movie in real time, this implies that each image is calculated in $1/24^{th}$ of a second at the maximum.

The sensation of virtual immersion consists in giving the impression to the user of being really physically inside the virtual 3D space. This sensation can be more or less strong in function of the adequacy between what is sensed by the senses of the user and what would be sensed if the user was really in the physical equivalent of the virtual 3D space.

Systems which present to the user's eyes images which are coherent with the rotation movements of the user's head are generally called Virtual reality systems.

The most commonly used technique for obtaining a virtual reality system is a virtual reality headset. The user wears the headset on his head and the headset is connected to a computer. The headset presents, by means of displays and a set of lenses placed before the user's eyes, to each eye synthesis images calculated in real time by the computer. The headset also comprises a sensor enabling to measure the orientation of the user's head. Use is also made of algorithms which enable to predict the movements of the user's head.

The principle is the following, when the user turns his head, the virtual reality headset perceives this movement of the head and sends the information about the new orientation of the user's head to the computer. The computer makes a stereoscopic rendering of the virtual 3D scene with an orientation of the two virtual cameras corresponding to the new orientation of the user's head. The images rendered in real time by the computer are displayed before the user's eyes.

It should be noted that the modern virtual reality headsets, such as the one made by the company "Oculus", enable to take into account not only the orientation of the user's head, but also his position.

Different factors will influence the quality of the immersive experience at the visual level. The principal factor is the adequacy between the movement of the user's head measured by his inner ear and his vision. In reality the user is used to a perfect adequacy between these two senses. In function of the level of incoherency between the images seen by the eyes and the movements felt by the inner ear of the user, the latter will feel a slight feeling of being uncomfortable, a visual tired, headaches, a feeling of disease and a stomach return which could lead to vomiting. Those effects are called the "virtual reality sickness" or "Cyber-sickness" and can be compared to being sea-sick.

While recording a scene, which takes place in a space, a classical camera records the action taking place just in front of it and on the sides up to the limit of the field of vision. This field of vision is expressed in degrees and provides the total vision angle covered by the camera.

In the particular case of spherical video, the field of vision of the camera is of 360° horizontally and 180° vertically, the field of vision is thus total as the camera can see in all directions.

A stereoscopic spherical video couples the characteristics of the spherical video and the stereoscopic video. It thus concerns a video couple, the one provided to the right eye and the other one for the left eye. Each of those two videos covers the complete spherical field of vision.

By coupling a virtual reality headset with a stereoscopic spherical video, one obtains a known immersive video system. The virtual reality headset measures the orientation of the user's head and transmits it to the computer. The computer extracts from each of two stereoscopic spherical videos the part of the video which corresponds to the field of vision of the new orientation of the user's head. Those two pieces of video are displayed before the user's eyes.

These known immersive videos present certain immersive characteristics, for example a certain adequacy between the rotation movements of the head felt by the inner ear and the images reaching the user's eyes, and a certain perception of depth of the scenes presented to the user. But these known immersive videos are taken from a unique viewpoint, they do not enable to take into account the translation movements of the user's head, which considerably reduces the immersion sensation and above all substantially increases the chances of "cyber-sickness".

Before the invention, the two methods enabling to obtain an immersion sensation in a video were on the one hand the virtual reality, which can take movements into account, in particular a translation, of the user's head, and thus create a good immersion sensation, but implies to calculate the images in real time which considerably reduces the image quality, and on the other hand the known immersive videos, which do not provide good immersion sensations and induce a high risk of "cyber-sickness".

Figure 1:
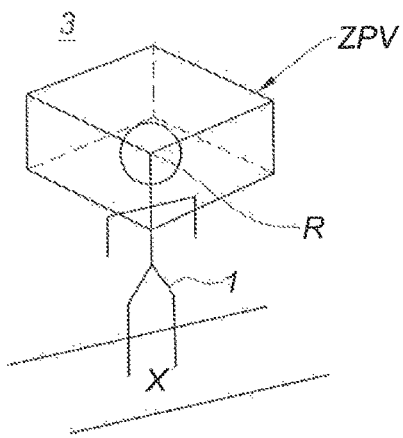
FIG. 1 illustrates a volume representing a zone of viewpoints in which a user can move his head.

The invention enables to take into account the shifting of the user's head 1 in a restricted volume which is called zone of viewpoints (ZVP) and which is illustrated in FIG. 1. The zone of viewpoints ZVP is determined by delimiting a volume from which a user 1 of the immersive video will be able to see the space 3 in which the scene takes place and perform with his head a translation and bending movement inside this zone of viewpoints. In practice the size of zone of viewpoint ZVP corresponds preferably to the latitude of the head movement which the user 1 has naturally around his position when at rest, while the user does not move the rest of his body. This rest position corresponds preferably to the position of the user's head 1 when he stands right and relax, without bending neither stand up or sit down. The latitude of the movement corresponds to the positions which can normally be reached by the user's head without doing a step, in the case of a standing position, and without standing up, neither displacing his chair, in the case of a sitting position. The exact size of the zone of viewpoints ZVP and its geometrical shape, can change in function of the position foreseen by the user 1. He can be either sitting down, laying down, or stand right.

The zone of viewpoints is for example formed by an essentially rectangular volume, in particular a rectangular parallelepiped, having a height of at least 30 cm, in particular 50 cm, a depth of at least 30 cm, in particular of 1 m, and a width of at least 30 cm, in particular 1 m. Such a dimension of the zone of viewpoints is sufficient for delimiting the potential positions of the head, and thus of the eyes, of the user 1. The point R is the central point of the zone of viewpoints ZVP, that is to say the point situated between the eyes of the user 1 when he is at a rest position. According to another embodiment the zone of viewpoints is formed by a volume having an essentially octahedron configuration.

By scanning the space as from the zone of viewpoints ZVP having the shape of a parallelepiped which measures for example 105 cm in depth and 45 cm in height, with a range of 15 cm covered by a scanner, one will use a total of 8×8×4=256 scanners.

Care has to be taken that the zone of viewpoints ZVP presents a sufficient size but not too large. An infinite size of the zone of viewpoints would correspond to be in a standard virtual reality mode. This zone of viewpoints ZVP thus enables to limit the quantity of image data which will be stored in order to limit the storage capacity and to make them manageable in comparison with virtual reality systems which need to store tremendous quantity of information for obtaining a detail level equivalent to the one obtained by the method according to the invention.

Figure 2:
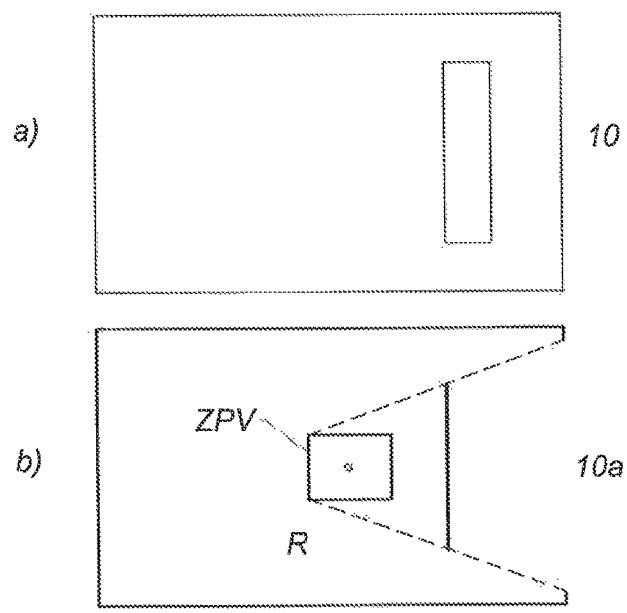
FIG. 2a illustrates a scene and FIG. 2b the visible part of the scene scanned with respect to the zone of viewpoints.

FIG. 2 illustrates a comparison between the information present at a scene 10 of virtual reality and a scene 10A of an immersive video with parallax according to the invention. The scene 10 in virtual reality in which the user can be located, is complete. That is to say, when the user is moving within the scene 10, the set of objects of the virtual scene are loaded into the scene. While, according to the invention, only the elements which are potentially visible as from the zone of viewpoints ZVP are loaded at a given moment. In FIG. 2b the more thicker lines of the scene 10A show the part of the elements of the scene which are potentially visible as from the zone of viewpoints ZVP. Thus, only the left side of the rectangular shape is visible, while the right side of the scene circumference 10a is not visible as from the predetermined zone of viewpoints ZVP. This enables to reduce the number of points touched by the scanner beams and thus enables to reduce the need of memory capacity for recording the information of the touched points.

Figure 3:
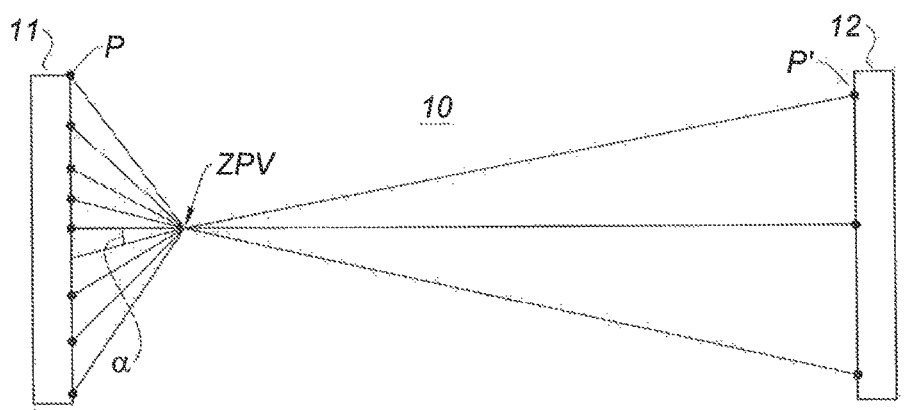
FIG. 3 illustrates a precision concept of the space scanned with respect to the zone of viewpoints.

FIG. 3 illustrates the concept of precision of points touched in space by a scanner beam emitted by a scanner. Always in the example of the scene 10, in virtual reality, the precision of the modelling of the virtual objects in the virtual scene is homogeneous. That is to say that the precision in the details of the models will be the same for all the objects 11 and 12 in the virtual scene. In the case of the invention, the objects 11 close of the zone of viewpoints ZVP present much more precision than the objects 12 which are far away. Thus, the points P touched by a scanner beam and which are close to the object 11 present more touched points resulting from the scanning than the points P' touched of the object 12 far away. According to the example of FIG. 3, the touched points P of the close object 11 present nine points, while the touched points P' of the object 12 faraway present only three points. Thus, the precision is variable in function of the position of the zone of viewpoints ZVP, the precision of a same object can be very large at one moment in the immersive movie and very weak at another moment. Just like in nature, the objects which are close to the zone of viewpoints ZVP present a good resolution and the objects far away a less good resolution, everything thus depend of the distance between the object and the zone of viewpoints ZVP.

Figure 4A:
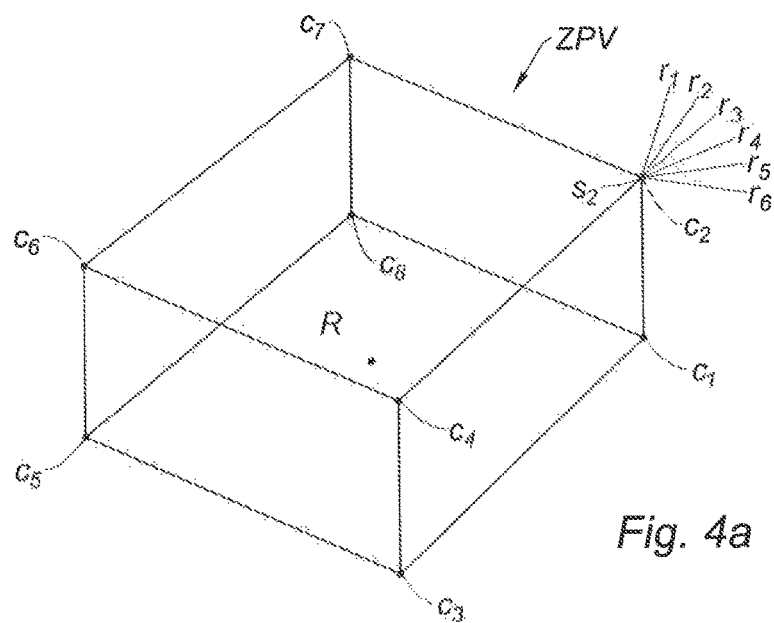
FIGS. 4a and 4b illustrate the position of the first set of at least n scanners in the predefined zone of viewpoints.

As illustrated in FIG. 4a, for collecting image data destined for producing the immersive video, the method according to the invention comprises the set-up of a first set of at least n scanners $S_1, s_2, \ldots s_n$ (n>1), each provided for producing scanning beams $r_1, \ldots r_{j-1}, r_j$ (j≥J). The minimal number J of scanning beams is determined in function of the resolution of the display screen foreseen for the visualisation. Preferably the scanning step, that is to say the angle between two subsequent beams $(r_j\text{-}r_{j+1})$ is lower or equal to the angular resolution of the display. For clarity reasons, only for one of the scanners the scanning beams are represented in the drawing. Each of the scanners $s_i$ (1≤i≤n) of the first set is used to scan, by means of the scanning beams, the space 3 for producing image data of that space, which image data are thereafter stored in a memory.

In order to set up the scanners of the first set of at least n scanners, a second set of m (m>1) source points C1, C2, ..., C7 and C8 situated at end points of the zone of viewpoints ZVP is determined. The number of eight source points shown in the FIG. 4a is linked to the rectangular shape of the zone of viewpoints and is only given as an example and does in no way limit the scope of the invention. The set-up of at least n scanners is realised by placing at each source point each time one of said scanners of the first set.

Figure 4B:
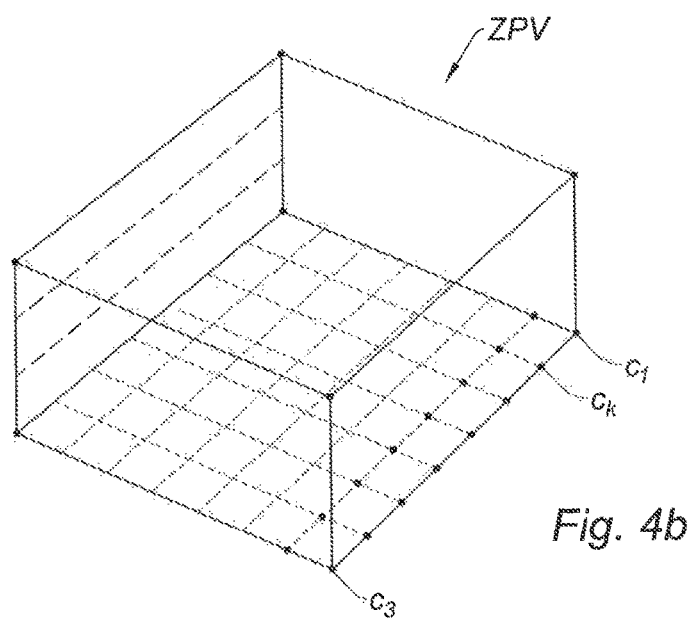

In order to scan the space with a sufficient definition the scanners are placed at the end points of the zone of viewpoints. Of course, it is possible to determine supplementary source points in the zone of viewpoints. FIG. 4b illustrates a configuration where the zone of viewpoints is provided with a grid. This grid is preferably applied on each of the faces. The different points of this grid can form source points $C_k$ destined for placing a scanner thereon. It is also possible to have source points inside the zone of viewpoints. The number of source points used at the end points of the zone of viewpoints is preponderant. The placing of supplementary source points at the surface of the zone of viewpoints can improve the quality of the sensations during the viewing. On the contrary, the increase of supplementary source points inside the zone of viewpoints has not much interest.

The term scanner is used in the description of the invention for a set of virtual or physical 3D scanners, which preferably realise a scanning in all directions, at 360 degrees.

Figure 5A:
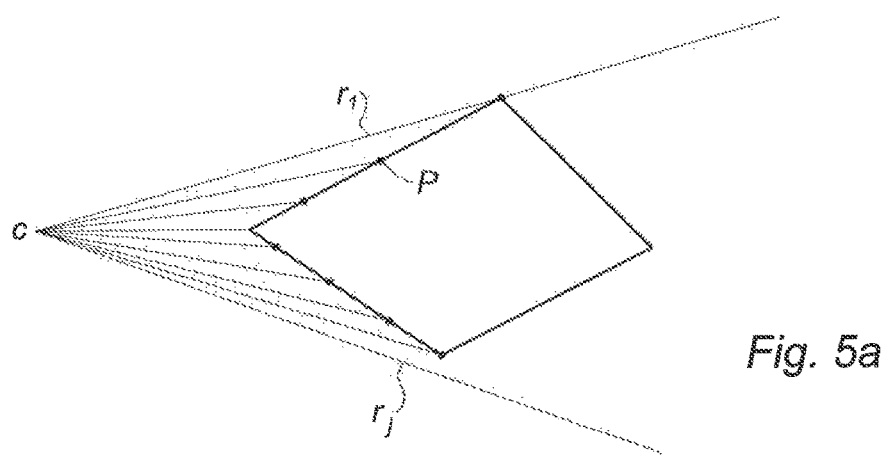
FIGS. 5a and 5b illustrate the points touched in the space scanned by each time a scanning beam emitted by a scanner.
Figure 5B:
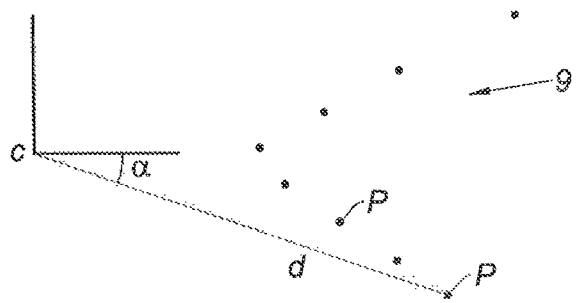

The scanning of the space is realised by means of scanners $s_i$ placed at the source points C by scanning step by step said space according to a succession of on the one hand azimuth angles, and on the other hand elevation angles each within a range predetermined by the zone of viewpoints. Preferably the scanning steps have an angle value situated between 0.01° and 1°, more particularly between 0.025° and 0.1°. The production of image data is realised by collecting for each scanning beam n (1≤j≤J) produced, the scanning beam reflected by each time a touched point P (see FIGS. 5a and b), situated within said space 3 and touched by the concerned scanning beam $r_1$. Based on the reflected scanning beam a distance (d) between the touched point P and the scanner s having produced the corresponding scanning beam $r_1$ is also determined at each step, as well as a colour parameter of said touched point. Thus, for each touched point P the distance d is obtained between that point P and a point, for example the central point, of the considered scanner. As the direction of each scanning beam is known and the distance d to the point P is calculated, the tridimensional position of the point P in the scanned space can be reconstructed.

The colour of the touched point P is for example calculated in the usual way for synthesis images as if the scanning beam was a vision beam of a virtual camera. The computer will thus take into account for calculating the colour of the touched point P the texture and the appearance of the touched object, the virtual light in the space 3 and their reflection as well as the position of the spherical virtual camera.

After having determined the distance d of the point P and its colour, these values are stored in the memory as image data. The storage is preferably done in the form of a matrix structured according to the azimuth and elevation angles. Each matrix element corresponds to the angle of the scanning beam. This is illustrated in FIG. 15 where the lines of the matrix each time show a scanning step according to an elevation angle and the columns of the matrix each time show a scanning step according to the azimuth angle. A stored value $V_{rc}$ at line r and column c represents thus the distance d and the colour obtained by the scanning beam having the elevation angle equal to the value of the scanning step according to the elevation angle multiplied by the value of the number r of the line and by the scanning beam having an azimuth angle equal to the value of the scanning step according to the azimuth multiplied by the value of the number c.

As the case may be, it is also possible to store in the memory the vector of the normal of the touched surface.

This matrix structure enables to store the data in the same manner as the one according to which the scanning takes place and thus to make their addressing easier.

The fact of using a second set of source points and at least n scanners will have as consequence that a same point in space will be reached by more than one scanner.

Figure 6:
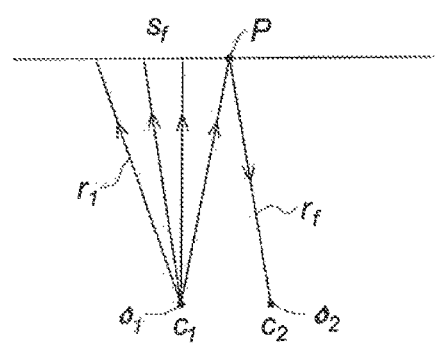
FIG. 6 illustrates the concept of a point in space which can be reached by two different scanners.

In the method according to the invention, only the information of the touched points which is useful for representing the scene from the zone of viewpoints ZVP is preferably maintained in the memory. To this end for each point touched by a scanner it is determined if that point can be reached by a beam launched by at least one other of said n scanners. This concept is illustrated in FIG. 6 which shows two scanners $s_1$ and $s_2$ respectively placed at the source points $C_1$ and $C_2$. The scanning beams r of scanner $s_1$ can reach the point P. Point P is now considered as being a source point at which a fictive scanner $s_f$ is placed and it is verified if a beam $r_f$ of that fictive scanner $s_f$ can reach the source point $C_2$ where scanner $s_2$ is placed. If this is the case, one can consider that point P as being reachable by scanner $s_2$. In the case where the considered touched point can be reached by a beam launched by at least one of the other n scanners it is determined on the basis of a predetermined selection criterion if the stored data of the considered touched point has to be eliminated from the stored data. The object of this filtering is to avoid redundant image data are stored in the memory.

Figure 7:
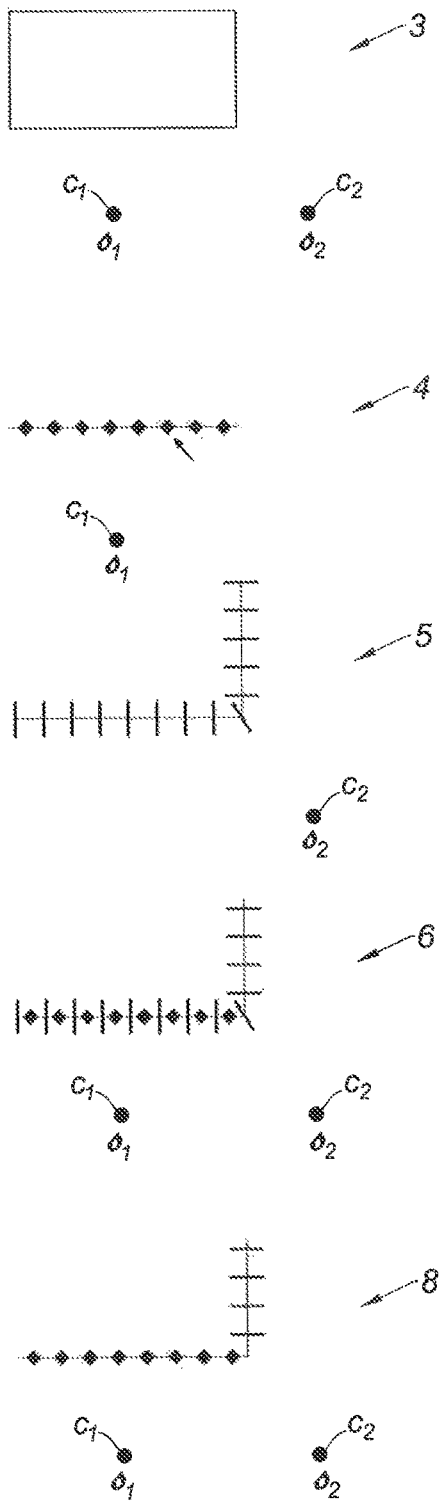
FIG. 7 illustrates the scanning of a scene and the filtering the touched points.

FIG. 7 shows the scanning of a scene with respect to two scanners $s_1$ and $s_2$ placed at respective source points $C_1$ and $C_2$. A first set 4 of touched points is obtained when the space 3 is scanned with scanner $s_1$. A second set 5 of touched points is obtained when scanning the space 3 with scanner $s_2$. The first and second set 4, 5 of touched points are different. The scanner $s_1$ can only reach the horizontal part of the scene in rectangular shape, while the scanner $s_2$ can reach the same horizontal zone as the scanner $s_1$ and also the vertical side of the scene at the right in the figure.

After having obtained the first and second set of touched points 4, 5, a filtering of those different touched points has thereafter to be applied. The touched points shown under 6 in FIG. 7 illustrate the mix of points 4 and 5 touched by the scanner $s_1$ and by the scanner $s_2$. It can thus be seen that within the points 6 the points of the horizontal part are doubled and that a filtering can take place. This filtering will then consist in eliminating the touched points of the horizontal part obtained by scanner $s_2$. Only the points shown under 8 will be maintained in the memory.

In order to proceed with the filtering the selection criterion is preferably based on the area of the surface scanned between two successive scanning steps according to an azimuth angle and two successive scanning steps according to an elevation angle by the scanner having produced the considered touched point and the single or several scanners among the n other scanners which could reach the considered touched point.

Figure 8A:
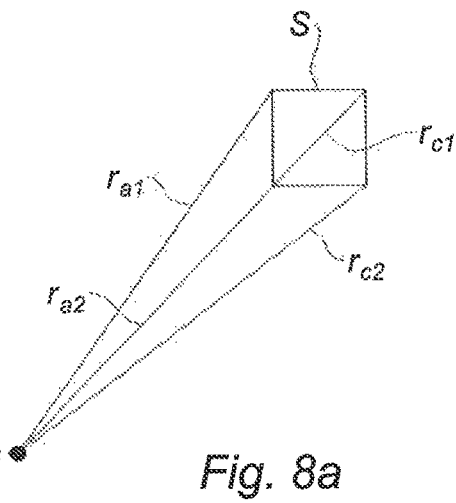
FIGS. 8a and 8b illustrate a method for filtering by apparent surface.

This concept of scanned surface area is illustrated in FIG. 8a. In this figure, the beams $r_{a1}$ and $r_{a2}$, respectively $r_{e1}$ and $r_{e2}$ represent successive scanning beams according to the azimuth angle, respectively the elevation angle.

The surface is delimited on the one hand by the points touched by the beams $r_{a1}$ and $r_{a2}$, and on the other hand by the points touched by the beams $r_{e1}$ and $r_{e2}$, and form the scanned surface area between two successive scanning steps. When this scanned surface area is determined, it becomes possible to verify if one or more other of the n scanners of the first set of scanners can also reach this scanned surface. When this or these other scanners have been identified, it becomes possible to select among the data obtained while scanning by these other scanners the one to be eliminated.

Figure 8B:
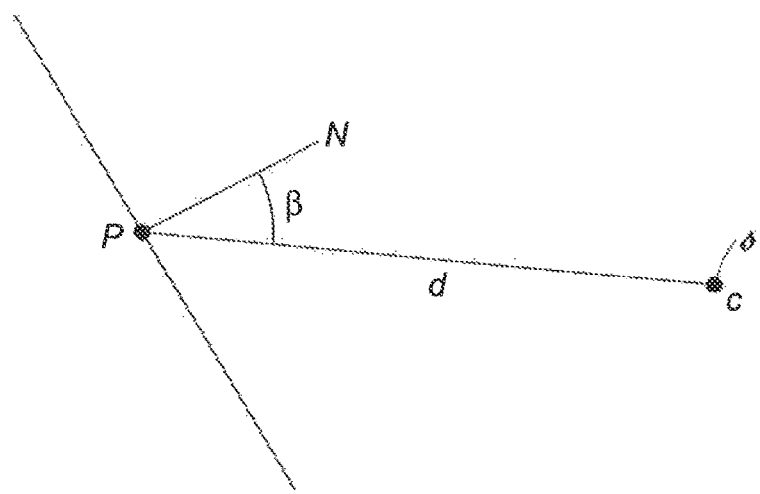

According to another embodiment illustrated in FIG. 8b, the filtering is realised in that an angle (β) between the normal N on the scanned surface and the scanning beam having produced the touched point P is determined. As the scanning step has an angle of low value the distance d of the touched point P with respect to the scanner s will not vary a lot between two subsequent scanning beams. One can thus use this distance d as a parameter for determining the area of the scanned surface. This area will then be proportional to the square of the distance (d) divided by the cosines of the angle β and the thus obtained value of this area can form the selection criteria. On the basis of the latter selection criteria only the data stored which is linked with the value having the smallest area of the scanned surface will be kept in memory. The idea consists in maintaining the touched point representing most of the details, and thus the one which represents the smallest scanned surface area.

It should be noted that the latter embodiment can be used for comparing the apparent surfaces of a same point between different scanners if they have the same angular definition.

The selection criteria can also be based on the distance between the touched point and the scanner having produced the touched point and the distance between the touched point and the single or several scanners among the n other scanners which can reach the touched point. The saved stored data being the one corresponding to the scanner having caused the smallest distance.

It is also possible to attribute beforehand a priority order to each of the n scanners placed on the source points, the selection criteria being based on this priority order. This filtering method is illustrated in FIG. 9. Use is made of an algorithm for each scanned point in order to verify if the scanned point P is visible from a scanner having a higher priority. If this is the case, the scanner having a higher priority will record the point. If not, it will be the running scanner which will record the point.

In FIG. 9a three scanners are showed noted $s_1$, $s_2$, and $s_3$. For simplifying the representation is made in two dimensions. The priority order of the scanners is equal to their number. Thus, the scanner $s_1$ has priority over $s_2$, which has priority over scanner $s_3$. The FIG. 9b shows the surfaces which will be kept for the scanner $s_1$. As it has priority over the other, it keeps all the surfaces it can see. The FIG. 9c shows the surfaces which will be kept for the scanner $s_2$. The scanner $s_2$ sees two zones which are not visible for the scanner $s_1$. The FIG. 9d shows the surfaces which will be kept for the scanner $s_3$. Those are the only surfaces which will be kept in the for the scanner $s_3$, indeed, the rest of the surfaces which the scanner $s_3$ can see have already been seen by the scanners $s_1$ or $s_2$ which have a higher priority.

Certain apparent colour components of a point on an object will depend of the position of the camera, which position will influence the incident angle of the scanning beam on the scanned object. This component is called in synthesis images the specular part of the rendering. In order to explain this in a simple manner, this part is equivalent to a reflection of a scanning beam.

The same point on a same virtual object with a same light will not have the same appearance for two different positions of the virtual camera because of this reflection component.

This concept is illustrated in FIG. 16 which shows a space 3 which comprises for example a reflective wall 15 like a mirror. A scanner $s_1$ is placed in front of this wall and launches a scanning beam $r_j$ towards this wall. As this wall is reflecting, the scanning beam $r_j$ will be reflected by this wall according to a same angle as the incident angle on the wall and this reflection will produce a scanning beam $r_{j'}$ which will touch object 16 which is on its passage. This will on its turn cause a reflexion of the scanning beam $r_1$ by this object. The latter will then reach the wall 15 as from which it will be reflected towards the scanner $s_1$. The latter will thus consider the latter reflected beam as coming from point P on the wall 15 and not as coming from the object 16. It is thus the colour of the object 16 which will be considered by the scanner $s_1$ as being the one of the point P.

In such a case of objects with important specular or simply highly reflecting material, there is thus a risk to have incoherence by placing side by side two points which have been taken from two different scanners, placed at different positions.

Preferably, use is made of a rendering technique for calculating colours of points which "cheats" on calculating the direction of the scanning beam.

The used method consists while calculating the colour of a touched point P to give for calculation of the beam reflected by the surface 15, not the real direction of the scanning beam launched by the scanner which calculates that point P, but a beam for which the direction would correspond to the one of a beam launched from a source point K, preferably placed at the centre of the zone of viewpoints ZVP. Thus, all reflections and specular will be coherent, for a same touched point P, whatever be the position of the recording 3D scanner.

In pre-calculated synthesis images, the colour of a pixel is generally not calculated on the basis of a single beam launch, but rather on a plurality of beams in the pixel surface. Each launched beam for a pixel corresponds to a sample for determining the colour of the pixel. The multi sampling consists thus in launching several beams for a same pixel and to make a weighted average of the colours obtained for each beam in order to determine the final colour of the pixel. The fact of raising the number of samples for a pixel increases substantially the quality of the rendering in particular in situations where the pixel corresponds to the border of an object.

In a similar manner, for calculating the colour of a touched point P in a direction, it is possible to improve the quality of the rendering by multiplying the scanning beams inside a same scanning step. FIG. 10 illustrates how by means of four other scanning beams originating from a scanner s and situated inside of a same scanning step, one can determine other touched points P1, P2, P3 and P4 in space. The colours and the distances d of the four other touched points thus obtained by the four other scanning beams could be averaged. But, in the case of recording distances, this averaging poses a problem. Indeed, the different other scanning beams can touch objects 16 and 17 at different distances.

If the distances are averaged, one obtains in this case distances which do not correspond to any surface in the scanned space. The problem is that viewed from a somewhat different viewpoint, these averaged points will pose a problem as they will appear as hanging in the void. This point suspended in the void is marked with an x in FIG. 10. According to the example shown in FIGS. 10, P1 and P2 are two scanned points of an object 16 having a blue colour. P3 and P4 are two scanned points of an object 17 having a red colour. Thus, the colour of point x, if determined by simply making an average of the other touched points P1, P2, P3 and P4 will be purple and its position the average position of the points p1, P2, P3 and P4. When that point x is viewed from a camera placed at source point C, this will not cause a problem. From another viewpoint D, the point x will not correspond to an existing geometry in the scanned space and that point x will appear as floating in the air.

One can of course just store the image data of all those other touched points but finally this corresponds to increase the resolution of the scanner and thus to increase the quantity of stored data.

Preferably use is made of a method which enables to correctly aggregate a plurality of other touched points which, once averaged with respect to their distance, do not create points floating in the air. This preferred variation consists in employing a method called "Clustering", which groups the other touched points in different groups which are spatially coherent. If an average is then made over the distance of the other touched points of a same group, a spatial position is obtained which is coherent with the existing geometry in the scanned space.

Several methods of "clustering" which are commonly used in the framework of artificial intelligence are possible, such as for example the method called "k-means".

Finally, one, two or three groups of other touched points are obtained, and the colour of these other touched points within this group can be averaged, as well as their depth without having problems of points floating in the air.

Starting from the other touched points obtained by the other scanning beams, a set of distances is determined comprising for each other touched point the distance between that other touched point and the scanner. Thereafter the minimum distance and the maximum distance is searched among the distances of said set of distances.

This is for example illustrated in FIG. 11. As far as the user at the moment of visualisation will stay in the zone of viewpoints ZVP, the difference between the maximum distance which is possible between the viewpoint of the user and the centre of each scanner can be calculated, calling this distance $\Delta ZVP$ (delta viewpoint). In FIG. 11 it should be noted that the scanner centre is C, V the position of the most far away viewpoint possible in the vision zone with respect to the scanner centre, $\Delta ZVP$ being the distance between C and V. dmax corresponding to the distance with respect to C of the other touched point the furthest away: Pmax, dmin corresponding to the distance with respect to C of the other most close touched point Pmin, $\alpha$min corresponds to the angle formed between the strait line going from point V to point C and the strait line going from V to point Pmin, $\alpha$max being the angle formed between the strait line going from point V to point C and the line going from V to point Pmax, $\Delta\alpha$ being the angle difference between $\alpha$max and $\alpha$min. It is then possible to calculate: $\alpha min = \arctan(dmin/\Delta ZVP)$, $\alpha max = \arctan(dmax/\Delta ZVP)$, and $\Delta\alpha = \alpha max - \alpha min$.

If the other touched points are situated in a range of distances with respect to point C leading to a value $\Delta\alpha$ which would be inferior to half of the angular definition of the display, the splitting into groups of other touched points is not necessary. Indeed, in such a case, the distance difference will not be perceived from any point of the zone of viewpoints and a weighted average of the calculated value of those other touched points will be determined and this weighed average will be substituted to the value of the stored image data for the point touched at the considered scanning step.

If on the other hand such a separation in groups is necessary there is a separation in different groups on the basis of the position of said other touched points and one chooses according to a predetermined criterion a group among those groups, the point touched at the considered scanning step being determined by a weighted average of the calculated values for those other touched points in the selected group.

The general principle is that a gap of 5 cm in depth at a distance of 1 Km will not be distinguished from any viewpoint inside the zone of viewpoints, on the contrary a gap of 5 cm at a distance of 50 cm will be highly perceived.

A selection criterion for the group of other touched points can be either the number of points of which the group is constituted or its average distance with respect to the centre of the scanner.

For creating the equivalent of a camera movement in the immersive video according to the invention, the zone of viewpoints is preferably moved in space as from a first initial position towards at least a second position situated at a predetermined distance of this first position. The scanning by each of the scanners of the first set of scanners and the production and storage of image data of the space being repeated for each second position of the zone of viewpoints after the one performed for the first position.

A characteristic of the invention is that the density of touched points is coherent with the angular resolution of the display, as illustrated in FIG. 12. A surface 51 far away from the zone of viewpoints ZVP presents only three touched points, while a closer surface 52 presents at least five time more touched points. The density of touched points for a remote surface is low and the different touched points are at quite a distance from each other. The density of touched points on a closer surface is much higher, and thus better defined. This is coherent with the display definition when visualising an immersive movie with interactive parallax according to the invention.

The visualisation of the immersive video with interactive parallax according to the invention, comprises the following steps:

a) a determination within the zone of viewpoint of a position and an orientation of the eyes of a user by means of sensors and the use of predictive algorithms of the head movement of the user, for determining what will be seen by the user;

b) a selection on the basis of the position and orientation of the eyes of the user of image data among the stored image data necessary for visualising the part of the space which can be seen by the user;

c) a loading in a temporary memory of the selected image data;

d) a production of two images on the basis of the image data stored in the temporary memory; and a display to the user's eyes of the two produced images.

The user, having a restricted vision field can at a given moment only see a part of the scanned space encoded by the image data.

Preferably, the scanned space is stored under a form which separates in slices the touched points. Each slice corresponds to a slice of the scanning directions. For example, a slice can encode the points seen by different scanners corresponding to azimuth angles of 0 to 45 degrees and elevation angles from 90 to 125 degrees.

A lot of methods have been studied and can be used for displaying the touched points. We can for example mention: Gaël Guennebaud, Loïc Barthe, Mathias Paulin: Interpolatory Refinement for Real-Time Processing of Point-Base Geometry, published in Eurographics 2005, Dublin, Ireland, vol 24, No 3.

Preferably the rendering of touched points is not lighted again, the colours encoded in the points are directly the one which will be presented to the user, there is no re-lighting at the time of visualisation.

Preferably, the scanning of the points is ecospheric, that is to say that it is adapted in function of the elevation angle as illustrated in FIG. 13. The points at the poles of a sphere are not scanned with the same azimuth angle step as the one on the equator, and this in order to avoid redundant points and thus limit the number of points to scan. The scanning with the smallest azimuth angle step will be realised at the equator, while at the other latitudes the scanning will have a higher azimuth angle step. The ecospheric method keeps the principle of encoding the latitude in the ordinate of the storage matrix, and the longitude in the abscise of the storage matrix, just as for the equirectangular encoding, but the ratio between azimuth and abscise is no longer linear.

Thus, one calculates for each scanned line (each elevation), the equivalent circumference of the circle which is represented by that line. Just as a line of the storage matrix represents a horizontal cross-section of the sphere, this will provide a circle on the horizontal plane cross-section.

This circumference is thus, on the basis of a sphere with a radius 1 of sin $(\alpha)*2*PI$. With an elevation angle a starting from the North pole, that is to say at the North pole $\alpha=0$ degrees, at the equator $\alpha=90$ degrees and at the South pole $\alpha=180$ degrees, the ratio of this circumference with the circumference at the equator is thus simply sin $(\alpha)$.

All points on a same line are at a same distance from each other corresponding to on angle increment of $\Delta\beta$ . . . But this angle increment $\Delta\beta$ varies from line to line, again relative to sin $(\alpha)$. According to the formula $\Delta\beta=360$ degrees/(number of columns of the storage matrix multiplied by sin $(\alpha)$). It should be noted that all the columns of the storage matrix are only used at the equator, all the other latitudes use less columns.

The ecospheric method enables to have a good homogeneity of the surfaces corresponding to each touched point in space and covers completely all the scanning directions.

At FIG. 13 a slice of the corresponding sphere at all the longitudes is shown for a latitude $\alpha=45°$ corresponding to circle 26. The circle 25 is a slice of the sphere corresponding to all the longitudes for a latitude corresponding to equator ($\alpha=90$ degrees). The projection 40 is a circle seen from above and corresponding to a latitude of the equator, its radius is by definition 1 and its circumference is of $2\pi$, the projection 50 is a circle seen from above at a latitude $\alpha=45°$, its radius R is of sin $(\alpha)$ and its circumference of $2\pi* \sin(\alpha)$. W is the centre of the sphere, M is the corresponding ecospheric storage matrix. The line 90 is the stroke of touched points corresponding to a latitude $\alpha=45°$. One will observe that not all the columns of the matrix M are taken into account, indeed only a number of columns defined by the total number of columns of M multiplied by sin $(\alpha)$ is considered. The line 100 is the stroke of touched points corresponding to a latitude of the equator, it takes all the columns of the matrix M.

The zone of viewpoints ZVP can be shifted by the video director just like he would move a camera with a unique viewpoint, as illustrated in FIG. 16. Thus, contrary to virtual reality where, at the moment of rendering in real time, a camera is moved in a virtual space when the user is moving. According to the invention it is the space 3 which moves around the user 1 when the zone of viewpoints ZVP has been shifted while creating the immersive movie.

One can think of the system as recreating around the user 1 at the moment of visualisation, a virtual 3D scene for each time fraction of the immersive video. Each of the virtual ephemeric scenes is limited to what the user 1 can see as from the predetermined zone of viewpoints ZVP. The evolution of the aspect of those scenes corresponds to the movement of the objects or persons in the video and to the movement of the position of the zone of viewpoints controlled by the movie director.

Thus, in FIG. 14 a scene 3 is scanned from a first position of the zone of viewpoints ZVP at a first time $t_1$, and thereafter it is again scanned as from a second position in the zone of viewpoints at a second time $t_2$. Thus, at t1 a first set of touched points 9 is obtained, and thereafter at t2 a second set of touched points 9' is obtained. For the user 1 it is the scene which has been moved.

At visualisation, it is of interest to be able to mix synthesis images in real time with images generated according to the invention. Thus, one can for example add an avatar formed by the user's body, or avatars of other user's bodies which are or not physically present. It is also possible to add informative elements such as text or schemes in function of the direction at which the user looks, or game elements, such as dynamic targets. One can also add static or dynamic advertising.

Upon reading the immersive video according to the invention, the user can be put on a system recreating acceleration sensations thereby conferring a movement to the user.

The visualisation can also be improved by a sound immersion enabling to have a sound in three dimensions with for example classical techniques such as Ambisonic, HRTF (Head Related Transfer Function) and Binaural.

The invention claimed is:

1. A method for collecting image data destined for producing an immersive video, which method comprises a setting up of a first set of at least n (n>1) scanners, each being provided for producing scanning beams, which method also comprises the scanning of a predetermined space by each of the scanners of said first set of scanners by means of scanning beams for producing the image data of said space, which image data are stored in a memory, characterized in that a zone of viewpoints is determined by delimiting a volume from which a user of the immersive video will be able to see said space and to perform with his head a movement, in particular a translation movement, inside the zone of viewpoints, a second set of m (m>1) source points located at the ends of the zone of viewpoints being thereafter determined, which setting up of said first set of at least n scanners being realized by placing at each of said source points each time one of said scanners of said first set, said scanning of said space being realized by means of said scanners placed at said source points and by scanning step by step said space according to a succession of at the one hand azimuth angles and on the other hand elevation angles each located in a range predetermined by said zone of viewpoints, which production of image data is realized by collecting for each produced scanning beam the scanning beam reflected by each time a touched point situated within said space and touched by the concerned scanning beam and by determining by each step and on the basis of the reflected scanning beam a distance (d) between the touched point and the scanner having produced the concerned scanning beam as well as a color parameter of said touched point, said data being stored in the memory in the form of a matrix structured according to the azimuth and elevation angles.

2. The method according to claim 1, characterized in that the zone of viewpoints is formed by an essentially rectangular volume, in particular a rectangular parallelepiped, having a height of at least 30 cm, a depth of at least 30 cm and a width of at least 30 cm.

3. The method according to claim 1, characterized in that the zone of viewpoints is formed by a volume essentially octahedron shaped.

4. The method according to claim 1, characterized in that the stored data are filtered by determining for each point touched by a scanner if that point can be reached by a beam launched by at least one other of said n scanners, and in case where the considered touched point can be reached by a beam launched by at least another of said n scanners it is determined on the basis of a predetermined selection criteria if the stored data of the considered touched point have to be eliminated from the stored data.

5. The method according to claim 4, characterized in that said selection criteria is based on the area of the surface scanned between two successive scanning steps according to the azimuth angle and two successive scanning steps according to the elevation angle by the scanner having produced the considered touched point and the single or several scanners among the other scanners being able to reach the considered touched point.

6. The method according to claim 5, characterized in that an angle ($\beta$) between a line perpendicular to the scanned surface and the scanning beam having produced the touched point is determined, the surface area being determined on the basis of the square of the distance (d) divided by the cosines of the angle $\beta$ and forms the selection criteria, and wherein the data stored with the value having the smallest scanned area is kept.

7. The method according to claim 4, characterized in that the selection criteria is based on the distance between the touched point and the scanner having produced the touched point and the distance between the touched point and the single or several scanners among the n other scanners being able to reach the touched point, the saved stored data being the one of the scanner having provided the smallest distance.

8. The method according to claim 4, characterized in that a priority order is established beforehand for each of the n scanners placed on the point sources, the selection criteria being based on said priority order.

9. The method according to claim 1, characterized in that scanners which are used are either virtual scanners, or physical scanners.

10. The method according to claim 1, characterized in that the azimuth scanning steps are adapted in function of the elevation angle.

11. The method according to claim 1, characterized in that inside a same scanning step several other scanning beams are produced and other touched points are determined by means of said other scanning beams, thereafter there being determined a set of distances comprising for each other touched point the distance between that other touched point and the scanner, a minimum and a maximum distance are searched among those distances of said set of distances, and on the basis of a criteria depending of that minimum and maximum distance it is determined if a distribution of said other touched points in different groups on the basis of their distance is necessary, if such a distribution is not necessary a weighted average of the other touched points is computed and this weighted average is substituted for the value of the stored image data for the touched point for the considered scanning step, if such a distribution is necessary said other touched points are distributed in different groups on the basis of their position and a group is selected according to a predetermined criteria among the different groups, the touched point for the considered scanning step being determined by a weighted average of the other touched points in the selected group.

12. The method according to claim 1, characterized in that the zone of viewpoints is shifted in said space from a first initial position towards at least a second position situated at a predetermined distance of the first position, the scanning by each of the scanners of said first set and the production and storage of the image data of said space being repeated for each second position of the zone of viewpoints after the one realized for the first position.

13. A visualization method of at least a part of the scanned space on the basis of image data collected according to the method according to claim 1, characterized in that the method comprises the steps of:
   a) a determination within the zone of viewpoint of a position and an orientation of the eyes of a user by means of sensors and the use of an algorithm predicting the head movement of the user, for determining what will be seen by the user;
   b) a selection on the basis of the position and orientation of the eyes of the user of image data among the stored image data necessary for visualizing of the part of the space which can be seen by the user;
   c) a loading in a temporary memory of the selected image data;
   d) a production of two images on the basis of the image data stored in the temporary memory; and
   e) a display to the user's eyes of the two produced images.

14. The method according to claim 13, characterized in that the display of two images to the user is realized by means of a virtual reality headset.

15. The method according to claim 13, characterized in that it is used in a device in which a movement is conferred to a user, the coordinates of said conferred movement being sent to a visualization system which applies said visualization method for synchronizing the flow of images with said movements.

* * * * *